US007424903B2

(12) United States Patent
Kägi et al.

(10) Patent No.: US 7,424,903 B2
(45) Date of Patent: Sep. 16, 2008

(54) FOIL WEB INSTALLATION FOR A FLAT BED EMBOSSING MACHINE

(75) Inventors: Beat Kägi, Bichwil (CH); Manfred Rösli, Herisau (CH); Bodizar Markovic, Gossau (CH)

(73) Assignee: Maschinenfabrik Gietz AG, Gossau (CH)

( * ) Notice: Subject to any disclaimer, the term of this patent is extended or adjusted under 35 U.S.C. 154(b) by 410 days.

(21) Appl. No.: 11/121,265

(22) Filed: May 3, 2005

(65) Prior Publication Data

US 2005/0247406 A1 Nov. 10, 2005

(30) Foreign Application Priority Data

May 4, 2004 (CH) ....................................... 789/04

(51) Int. Cl.
*B32B 37/00* (2006.01)

(52) U.S. Cl. ....................................... 156/459; 156/494

(58) Field of Classification Search ................. 156/443, 156/459, 468, 475, 494, 502
See application file for complete search history.

(56) References Cited

U.S. PATENT DOCUMENTS 4,350,310 A 9/1982 Frohling et al.
5,611,272 A * 3/1997 Steuer ......................... 101/23
5,979,308 A 11/1999 Kagi et al.

FOREIGN PATENT DOCUMENTS

DE 601816 8/1934

* cited by examiner

*Primary Examiner*—James Sells
(74) *Attorney, Agent, or Firm*—Oppedahl Patent Law Firm LLC

(57) ABSTRACT

A foil web installation for a flat bed embossing machine with foil webs (6), which are conducted across an embossing table (3) from unwinding rolls (7) comprises a braking—and guiding wall (10) ahead of the embossing table and foil feeding devices (9) for several foil webs after the embossing table. Between the unwinding rolls (7) and the embossing table (3) at least one flat braking—and guiding wall (10) acts as a foil tensioning device. This latter element comprises a fixed supporting layer (11) as supporting surface with suction openings (14), a cloth-like contacting layer permeable to air (12) lying on top of it and a flat vacuum chamber (17) with an adjustable vacuum source (13) assigned to it, wherein foil webs (6) are pressed against the braking—and guiding wall (10) and braked as a result of this. This makes possible a foil web installation simple to adjust, easy on the foil web for achieving high embossing performances with the best quality as well as short retooling times.

23 Claims, 5 Drawing Sheets

FOIL WEB INSTALLATION FOR A FLAT BED EMBOSSING MACHINE

Figure 1:
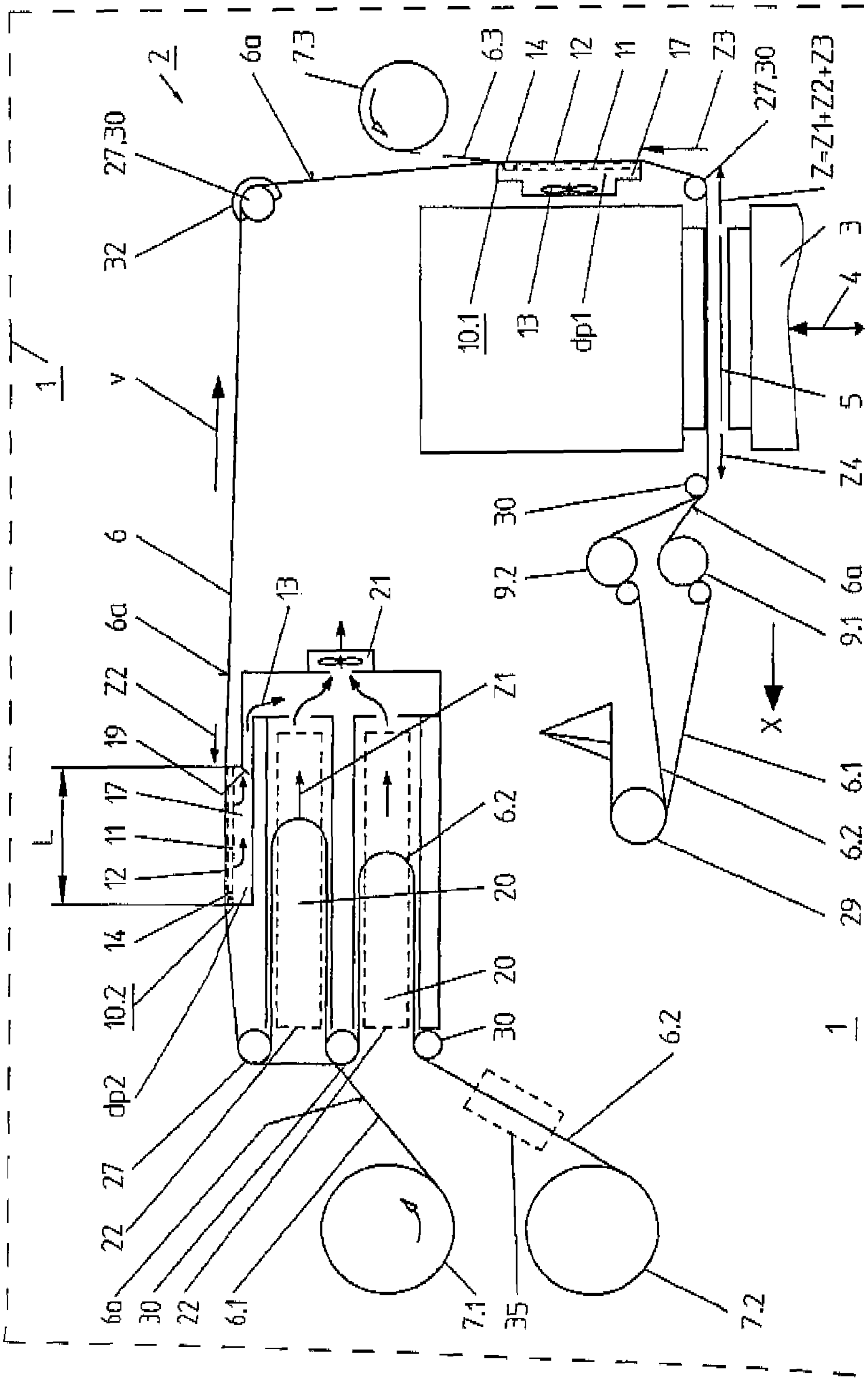

The invention is related to a foil web installation for a flat bed embossing machine with foil webs, which are conducted from unwinding rolls across an embossing table. With flat bed embossing machines or foil stamping machines of this kind, particularly high embossing performances in best quality and also particularly demanding embossing tasks, such as, e.g., relief embossing, are capable of being carried out. These flat bed embossing machines on the other hand, however, also make particularly high demands of the guiding and of the precise advancing of the thin and very sensitive embossing foil webs, with layer thicknesses of, e.g., solely 12-20 um (0.02 mm).

To achieve this, several foil webs of different kinds (with different web widths, advance lengths and with differing separation forces of the foil webs depending on the embossing task) simultaneously have to be guided and conveyed impeccably smoothly. The foil guiding has to take place without any draft, formation of creases, folds and displacements in an impeccably smooth and precisely positioned manner. And the rapid, intermittent advance in a short time across the whole embossing table has to be carried out with optimum care, in order to be able to obtain a high performance and high qualities. A flat bed embossing machine and foil web guiding installation of this type is known, e,g., from EP 0 858 888 or U.S. Pat. No. 5,979,308. The foil web guiding installation comprises a tensioning roller ahead of the embossing table, on which of necessity two deflection rollers are required on the embossing layer side of the foil webs, which are capable of impairing the sensitive embossing layer. Furthermore, here the tensile stresses for several foil webs are only able to be individually adjusted to a limited extent and with a relatively great effort being required. In addition, the required setting-up—and retooling times for several foil webs are still relatively long.

It is therefore the objective of the invention presented here to create a more simple foil web guiding installation with improved care for flat bed embossing machines, which also makes possible an optimum adjustment of the individual tensile stresses of several foil webs, which simplifies the setting-up and retooling of several foil webs and which also does not require any contact of the sensitive embossing layer side (image side) of the foil web with guiding elements.

This objective is achieved according to the invention by a foil web guiding installation for a flat bed embossing machine with at least one flat braking—and guiding wall as foil tensioning device ahead of the embossing table.

The dependent claims relate to advantageous further developments of the invention with further improvements of the foil web guiding installation and therefore also of the machine performance as well as to the shortening of the setting-up—and retooling times.

Figure 2A:
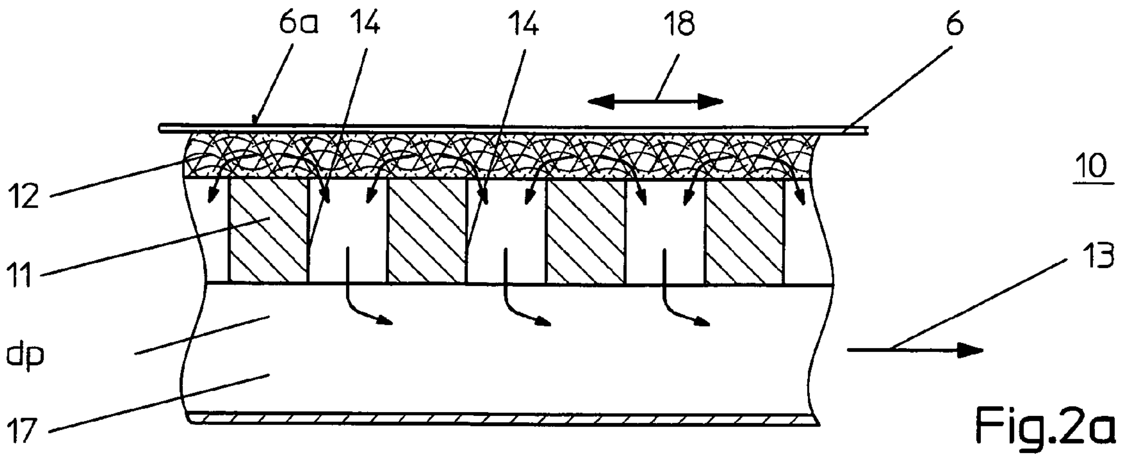
Figure 2B:
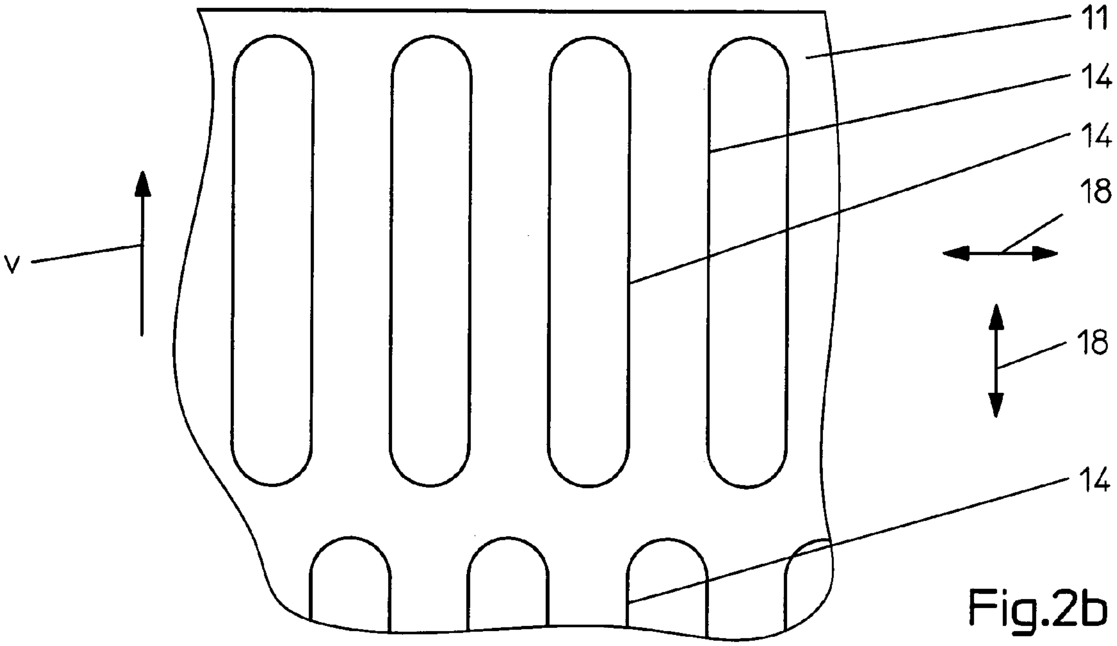
Figure 3:
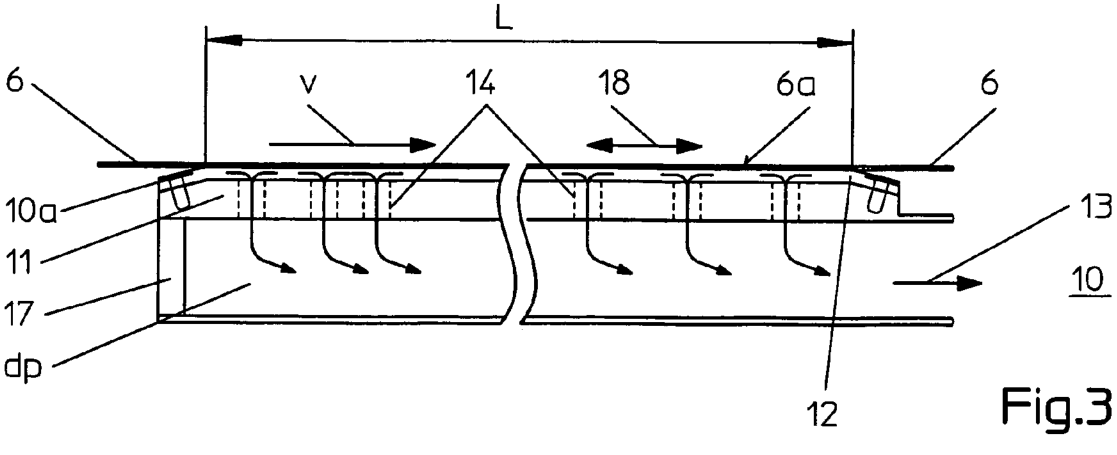
Figure 4:
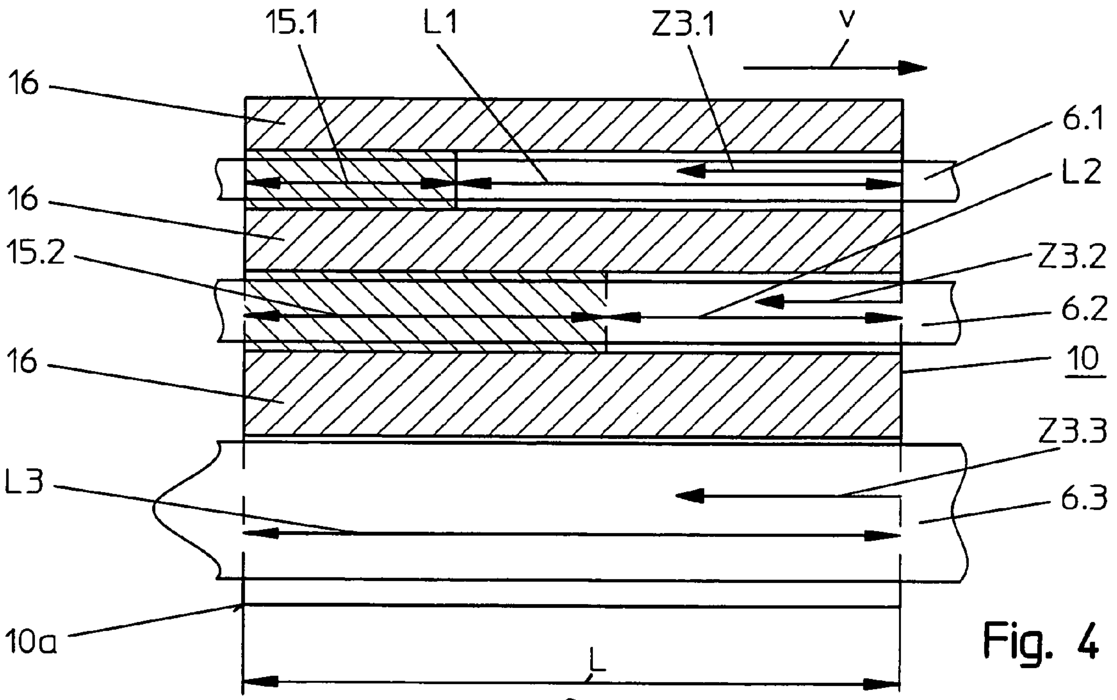
Figure 5:
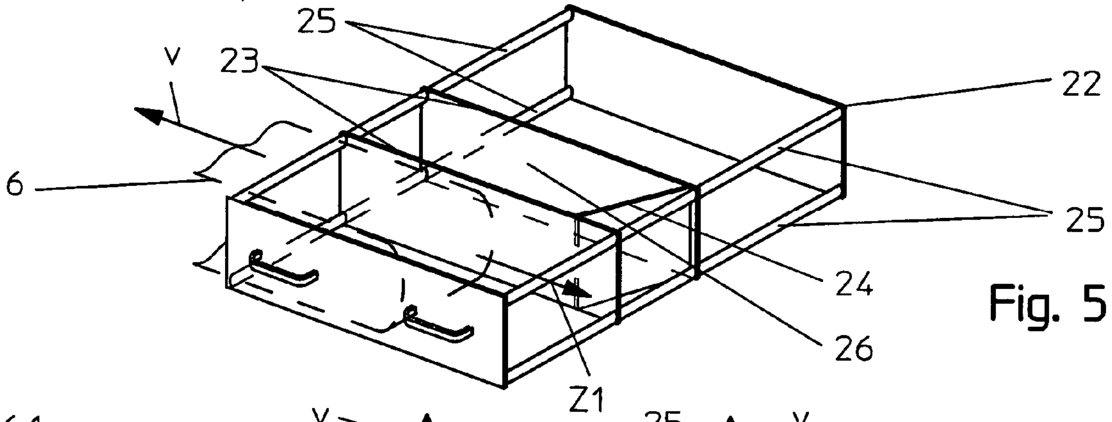
Figure 6:
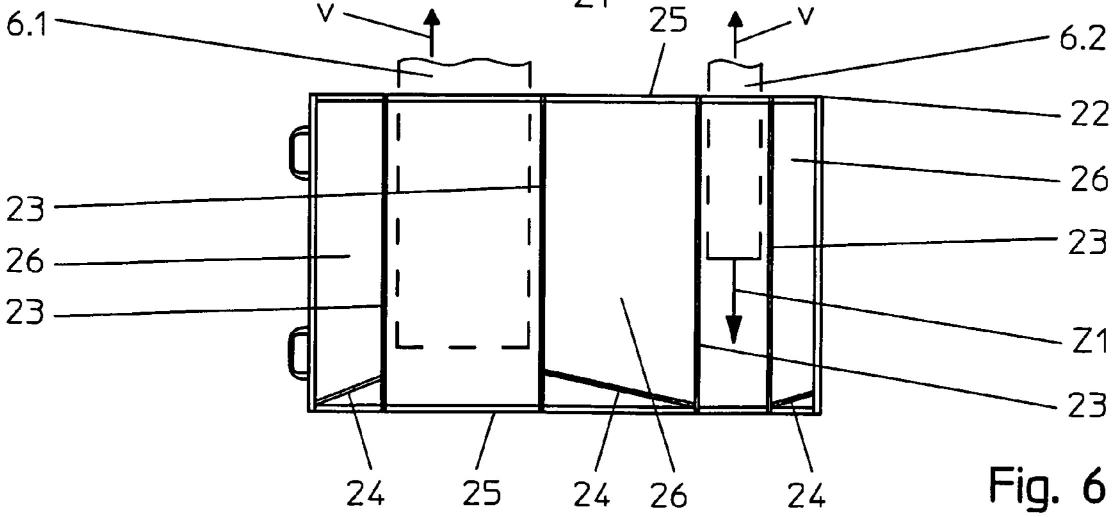
Figure 7A:
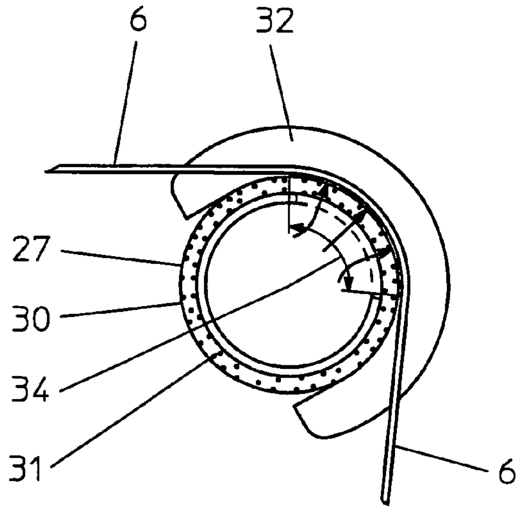
Figure 8:
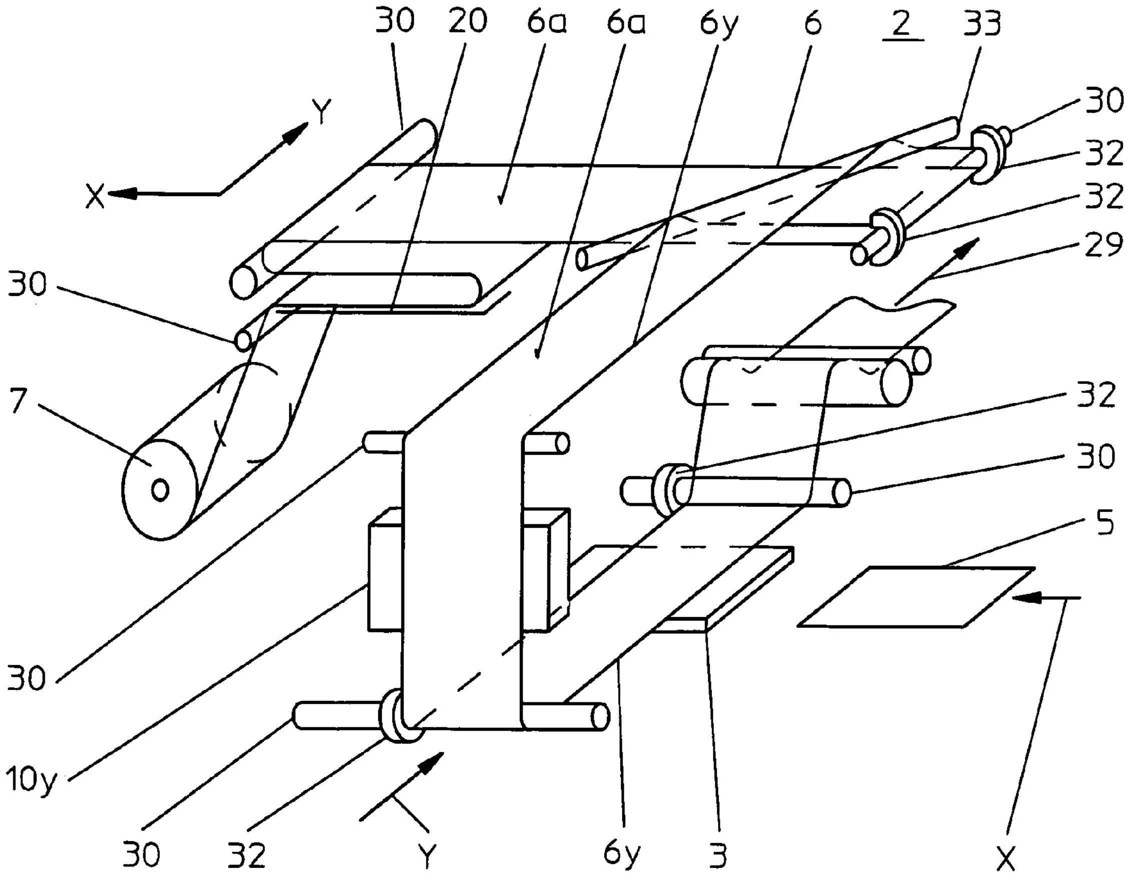
Figure 9:
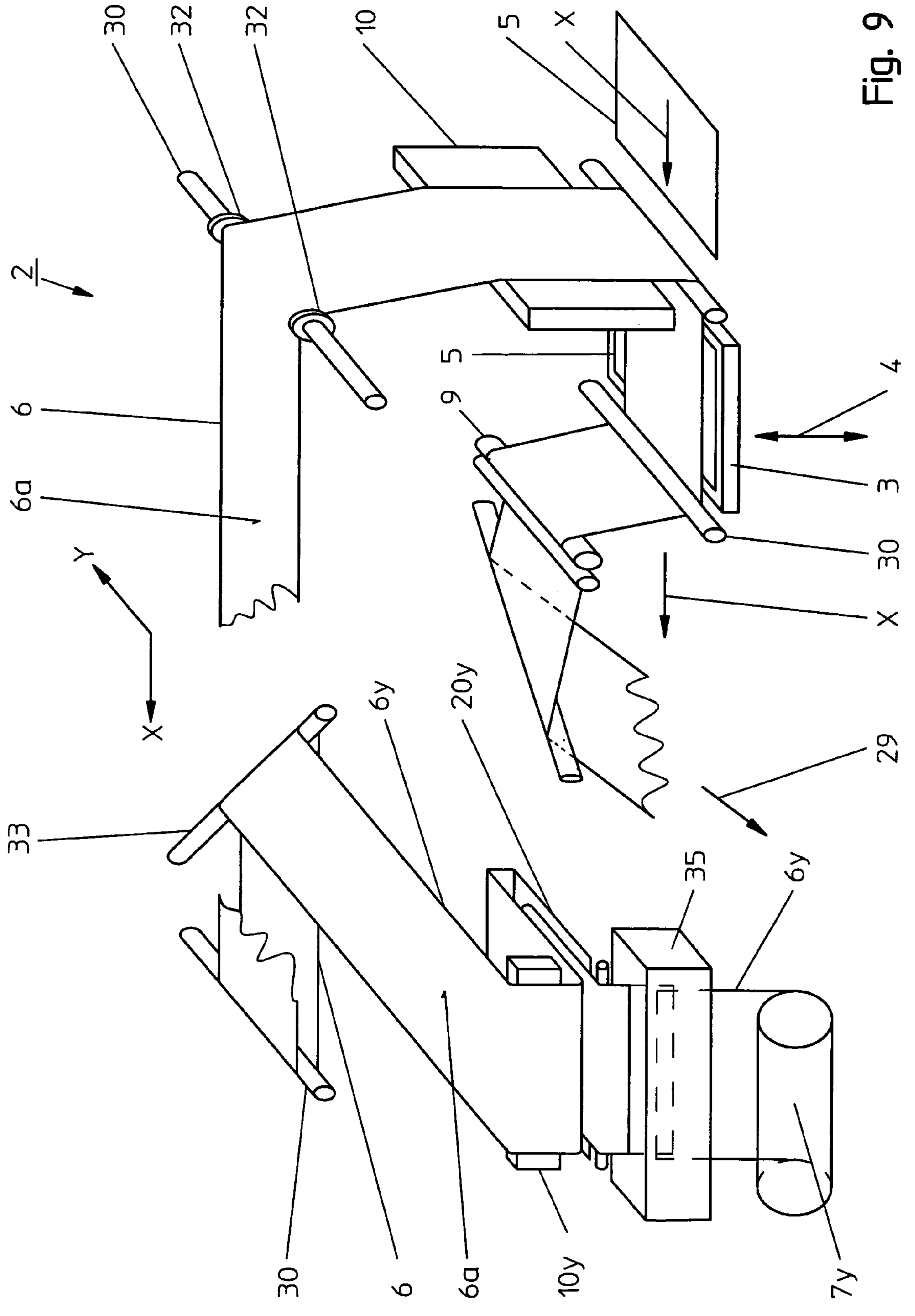

In the following, the invention is further described on the basis of examples and Figures, which illustrate:

FIG. 1 schematically a foil web guiding installation according to the invention in a flat bed embossing machine with flat braking—and guiding walls as foil tensioning arrangement, FIG. 2*a* in cross section a braking—and guiding wall with a fixed supporting layer with suction openings, a contacting layer permeable to air, a flat vacuum chamber and a vacuum source, FIG. 2*b* a supporting layer with slits in longitudinal direction, FIG. 3 a further example of a braking—and guiding wall in longitudinal section, FIG. 4 a braking—and guiding wall with coverings impermeable to air under the foil webs, FIG. 5 in perspective view a slide-in cartridge for a vacuum loop store, FIG. 6 in horizontal projection a slide-in cartridge with side walls and end walls, FIG. 7*a, b* a ventilated deflection bar with lateral guiding elements, FIG. 8 a foil advance in transverse direction, which has been deflected from the longitudinal direction, FIG. 9 a foil advance in longitudinal direction, which has been deflected from the transverse direction.

FIG. 1 illustrates a foil web installation 2 according to the invention for a flat bed embossing machine 1 with a flat bed press 4, wherein foil webs 6 are conducted from unwinding rolls 7 to an embossing table 3 for the embossing of flat material 5. The flat material 5 may consist of paper sheets or paper webs from rolls. The flat material is moved in the longitudinal direction X of the machine. In addition, it is also possible to pull foil webs on to the embossing table 3 in transverse direction Y (FIG. 8). The foil web installation 2 comprises a foil tensioning installation ahead of the embossing table and foil feeding devices 9.1, 9.2 for several foil webs 6.1, 6.2 after the embossing table 3. Between the unwinding rolls 7 and the embossing table 3 at least one flat braking—and guiding wall 10 is provided as foil tensioning installation, over which the foil webs 6 are conducted. These braking—and guiding walls 10 comprise a fixed supporting layer 11, which forms a supporting and guiding layer, with suction openings 14 and a cloth-like contacting layer 12 permeable to air fixed to the supporting layer 11 lying on it as well as an adjustable vacuum source 13 assigned to it, wherein in a flat vacuum chamber 17 a vacuum dp is produced. In this manner, the foil webs are lightly pressed on to the contacting layer 12 and with this guided and braked in an adjustable manner. The flat braking—and guiding walls 10 can also slightly be curved and with this additionally provide for a deflection of the foil webs 6. (In FIG. 1, e.g., the braking—and guiding wall 10.1 might comprise a slight deflection in direction of the embossing location 3.) The construction and the functioning of the braking—and guiding walls 10 are further explained in the descriptions of the FIGS. 2-4.

In preference a braking—and guiding walls 10.1 is located directly ahead of the embossing table 3, by means of which for every foil web 6.1, 6.2 individually an optimum tensile stress is capable of being adjusted for the embossing process, so that in particular also all foil webs 6 following the embossing operation are able to be impeccably separated from the embossed flat material 5 and taken away. The tensions for the separation are dependent on the type and the dimensions of the foil webs and on the embossing process (differing embossing surfaces and types of embossing, e.g., relief embossing).

Thanks to the space-saving, flat design of the braking—and guiding walls according to the invention, it is possible to attach additional unwinding rolls 7.3 for additional foil webs 6.3 here directly ahead of this braking—and guiding wall 10.1 or also for simple, smaller embossing tasks (which do not require a foil store), which here are capable of being set-up particularly rapidly and in a simple manner. A foil roll change is also possible rapidly, in that the new foil web is simply stuck to the old one on the braking—and guiding wall 10.1.

On the long path of the foil web installation 2 from the unwinding rolls 7 to the embossing table 3 it is also possible to provide more than one braking—and guiding wall 10. In the example of FIG. 1, an additional braking—and guiding wall 10.2 is provided shortly after a foil store 20. The foil stores are here designed as vacuum loop stores, in particular as horizontal vacuum double loop stores 20 and arranged in the foil web feeding installation, i.e., ahead of the embossing table 3. By the vacuum loop stores 20 a first tensile stress Z1 is produced in the foil webs 6.

For the braking—and guiding wall 10.2 here it is possible to utilise a suction fan 21 of the vacuum loop stores 20 as vacuum source 13. The vacuum dp2 in a vacuum chamber 17 is able to be additionally adapted by means of a variable throttling point 19. The mostly relatively moderate additional tensile stress Z2, which is produced by this braking—and guiding wall 10.2, is adjusted in such a manner, that an impeccably stretched foil web feed up to the next braking—and guiding wall 10.1. is obtained. The additional tensile stresses Z3 (refer to FIG. 4) on the braking—and guiding wall 10.1 can individually be adjusted for every foil web 6.1, 6.2, 6.3 in such a manner, that an optimum positioning at the embossing location 3 and an impeccable separation of the foil webs 6 from the embossed flat material 5 following the embossing is achieved.

In the example of FIG. 1, the foil web installation comprises a foil removal device 29 after the foil feeding devices 9.1, 9.2 for the lateral taking away of the embossed foil webs 6.1, 6.2. With this, once more a lot of building space is freed, which is able to be made use of for additional unwinding rolls.

The adjustment of the braking forces and of the tensile stresses in the foil webs at the vacuum loop store (Z1) as well as at the braking—and guiding walls (Z2, Z3) can be adapted to one another in such a manner, that the separation of the foil webs from the embossed flat material 5 following the embossing operation and the guiding of the foil webs takes place impeccably over the whole length and in an optimised manner.

At the embossing table 3 in the foil webs here a total tensile stress of Z=Z1+Z2+Z3 is produced. Through the compulsory, accurately positioned and very rapid foil advance by means of the foil feeding devices 9.1, 9.2 a tensile stress Z4 is produced, which has to correspond at least to the total tensile stress Z. The strain on the embossed foil webs at the foil feeding devices 9 with deflection rollers, which compulsorily also have to make contact with the image layer side 6*a* of the foil webs, is significantly higher than at the flat braking—and guiding walls 10, on which no guiding elements and no contact are required on the image layer side 6*a*. In the example of FIG. 1 the image layer side 6*a* is not made contact with over the whole route from the unwinding rolls 7 up to the embossing table 3.

The vacuum dp required at the large surface area braking—and guiding walls 10 is correspondingly relatively low and amounts to, e.g., 500-2000 Pa and the necessary total tensile stress Z produced in the very thin foil webs 6 amounts to, e.g., if at all possible less than 5 N/cm foil web width.

For the better foil web guiding in case of particularly demanding embossing tasks (e.g., for relief embossing) with correspondingly higher tensile stress Z, the positioned foil webs 6 on the embossing table 3 are capable of being partially relieved prior to the embossing by briefly running the foil feeding devices 9 backwards, thereupon they are embossed and subsequently once again pulled away with the full tensile stress Z and in doing so separated from the embossed flat material 5. For this purpose, the foil feeding devices 9 are able to run backwards, e.g., by 2-5 mm and with this reduce the tensile stress Z during the embossing operation.

The FIGS. 2*a* and 2*b* illustrate the construction and the mode of operation of the braking—and guiding wall 10. FIG. 2*a* shows in cross section a braking—and guiding wall 10 with a fixed supporting layer 11 (which forms a supporting—and guiding surface) with suction openings 14 and a flat vacuum chamber 17, in which a vacuum dp is produced by means of an adjustable vacuum source 13. On the supporting layer 11 a cloth-like contacting layer 12 permeable to air is attached and fixed, e.g., clamped all around. The supporting layer is permeable to air above all also in tangential direction 18, so that the vacuum dp under a foil web 6 running over it is equalised, resp., is uniformly distributed over the surface. The foil webs therefore are uniformly pressed on to the large surface area contacting layer 12 with a relatively low contact pressure, braked as a result of this and uniformly and constantly conducted in the foil feed direction, resp., direction of movement v of the foil webs. The contacting layer 12 consists of a soft material not subject to electro-static charging, so that no electrostatic friction forces are capable of being generated between the foil web and the contacting layer. The contacting layer 12, for example, may consist of natural fibres such as cotton (with a minimal electric conductivity) and may be developed as a fleece or as a textile object, such as a fabric, a knitted fabric or else as a felt and with spaces, in order for a required tangential permeability to air (18) to be produced. With this contacting layer 12 it is possible to obtain an essentially constant friction coefficient, wherein static friction and sliding friction hardly differ.

The layer thicknesses of this contacting layer 12 may amount to, e.g., 0.3-1 mm; depending on the type and the geometry of the supporting surfaces and of the contacting layer, their thickness may also amount to more, e.g., up to 3 mm. This contacting layer is able to be attached to the supporting layer 11 easily replaceably and it is therefore also very simple to change for the purpose of adaptation to the type of the foil webs.

FIG. 2*b* in horizontal projection illustrates an example of an in preference metallic supporting layer 11 with suction openings 14, which amount to an open surface proportion of preferably 30-60% of the total surface area of the braking—and guiding wall 10 and which comprise an average diameter of, e.g., 1-5 mm. FIG. 2*b* shows an advantageous execution of the supporting layer 11 as a slotted wall with slits, which extend parallel to the advance direction v of the foil webs 6 and which make possible a particularly good guiding of it. The width of the slits as well as the spacing between the slits, e.g., may amount to 1-3 mm and the length of the slits, e.g., to 10-30 mm. Other forms of the suction openings 14 are also possible, e.g., a perforated plate with a small hole diameter, so that the foil webs 6 essentially run over it flatly.

FIG. 3 illustrates an example of a braking—and guiding wall 10 in a section in longitudinal direction of movement v of the foil with a length L, which amounts to at least 20 cm, in preference, however, to more, e.g., to 30-50 cm. FIG. 3 also illustrates the very flat construction of the braking—and guiding wall 10 along the foil web 6, as a result of which in comparison with tensioning—and guiding installations known up until now significantly less space is required, which, e.g., creates space for additional unwinding rolls (7.3 in FIG. 1).

FIG. 4 illustrates an example of a braking—and guiding wall 10 with three foil webs 6.1, 6.2, 6.3 running over it and with coverings 15.1, 15.2 impermeable for air under a part of the foil webs, so that solely the not covered part L1, L2, L3 of the length L is under suction and corresponding proportional braking forces, resp., tensile stresses Z3.1, Z3.2, Z3.3 are produced in the foil webs. In this example, with the covering 15.1 less, with 15.2 more and underneath the foil web 6.3 nothing at all is covered. The desired optimum braking force, resp., tensile stress Z1 here therefore is capable of being adjusted individually for every foil web—and this practically between 0 and 100% and in a very simple manner.

Between the foil webs 6.1, 6.2, 6.3 it is also possible to affix impermeable for air coverings 16, in order to avoid a pressure drop, resp., a loss of pressure here and in order to adjust an optimally uniform distribution of the vacuum dp on the braking—and guiding wall 10.

The impermeable for air coverings 15 and 16 are very easy to cut to size out of sheets of paper and affixed to the front edge 10*a* of the braking—and guiding wall.

The braking—and guiding walls, i.e., the supporting layers 11 with the contacting layers 12 in preference are designed to be easily interchangeable, or capable of being slid-in. In this manner they are easily removed, the coverings 15, 16 thereupon newly adjusted and the layers 11 and 12 inserted once more, without it being necessary to move the foil webs or to have to set-up new ones. This is possible, because on the braking—and guiding walls 10 there are no deflection rollers present on the image layer side 6*a* of the foil webs and because these are indeed unnecessary.

The FIGS. 5 and 6 illustrate examples of slide-in cartridges 22 for vacuum loop stores 20, which are illustrated in FIG. 1. FIG. 5 shows a perspective view and FIG. 6 in horizontal projection an arrangement with partition walls and end walls of a slide-in cartridge 22. A foil web installation 2 with braking—and guiding walls 10 and combined with vacuum loop stores 20 makes a particularly good foil web installation and foil web conveyance. In order to further improve the foil web installation with optimum tensile stresses and in order to very significantly reduce the setting-up—and retooling times, it is possible to utilise removable slide-in cartridges 22 in the vacuum loop stores 20. On frame stanchions 25 here adjustable partition walls 23 are fixed in such a manner, that the desired foil webs are separated. The partition walls 23 are closed off at the bottom by end walls 24, with which separated chambers 26 not under suction next to the foil webs 6.1., 6.2 are formed in the foil loop store 20. With this, on the one hand a pressure loss between the foil webs is avoided and on the other hand a uniform, optimally adjustable suction force Z1 in the vacuum loop store is applied to the foil webs. With these slide-in cartridges 22 it is possible to carry out the optimum adjustment and retooling of the partition walls very rapidly, without it being necessary to remove the foil webs 6 themselves (solely the foil loops are pulled out of the vacuum loop store). The foil webs do not have to be set-up again.

The braking—and guiding walls 10 according to the invention in flat bed embossing machines and the slide-in cartridges 22 in the vacuum loop stores 20 make significantly reduced setting-up—and retooling times, an improved foil web guiding, higher embossing performances and an extended range of embossing tasks possible. With ventilated deflection bars it is even possible to achieve further improvements.

Figure 7B:
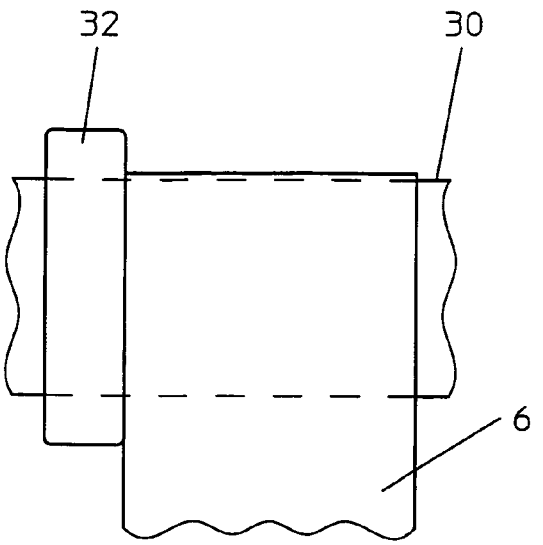

The FIGS. 7*a*, 7*b* illustrate a deflection element 27 for the deflection of the foil webs 6 in the form of a stationary, ventilated deflection bar 30, which produces an air cushion underneath the foil webs 6, so that these are deflected with minimum friction. With lateral guiding elements 32 the foil web on the air cushion is capable of being very accurately guided and stabilised. This in comparison with deflection elements 27 known up until now, e.g., in the form of roller axes, results in minimum friction forces and a better guidance of the foil web. Advantageously ventilated deflection bars 30 of this kind, as illustrated in FIG. 1, are able to be located, e.g., ahead of a rear braking—and guiding wall 10.1, ahead of and after the embossing location 3, at the entrance of the vacuum loop stores 20 and also at the foil advance in transverse direction Y (refer to FIG. 8) at the embossing station 3. In principle it is possible to design all deflection elements as ventilated deflection bars. The lateral guiding elements 32 e.g., can be manufactured as slip-on elements (clips) made of Delrin and simply be slipped-on to the stationary deflection bar 30 and also be displaced and adjusted. The ventilated deflection bars 30 may consist of a tube ventilated with a slight overpressure with a micro-porous layer 31, which produces a finely distributed air cushion underneath the foil web 6. This air cushion only has to be produced in the deflection range 34.

The foil web installation according to the invention with braking—and guiding walls 10 and with ventilated deflection bars, or air cushion axes 30 also makes it possible to deflect the foil web installation by means of ventilated 90°-deflection bars 33 from the machine running direction X to the transverse direction Y or vice versa, from the transverse direction Y to the longitudinal direction X, as is illustrated in FIGS. 8 and 9. Foil advances with unwinding rolls each respectively in longitudinal direction X and in transverse direction Y are known and are described, e.g., in EP 0 858 888 or U.S. Pat. No. 5,979,308.

FIG. 8 illustrates an example with a foil advance by in transverse direction Y with a braking—and guiding wall 10*y* in transverse direction Y and with ventilated deflection bars 30 with lateral guiding elements 32 ahead of and after the embossing location 3. This is particularly advantageous here, because the foil web 6*y* after the embossing operation has to be removed in transverse direction and because it should not be displaced in doing so. The unwinding roll 7 and the vacuum loop stores 20 here form a foil advance in longitudinal direction X. By means of a ventilated 90°-deflection bar 33, it is possible, however, to deflect (individual) foil webs 6 in transverse direction Y (as foil web 6*y*) (while other foil webs 6 simultaneously are conducted on in longitudinal direction to the embossing location 3). With this, here no additional unwinding rolls 7 and no vacuum loop stores 20 are necessary in transverse direction. The 90°-deflection bars 33 are arranged at an angle of 45° to the X- and Y-direction.

As is illustrated in FIG. 9, it is on the other hand also possible to deflect foil web advances in transverse direction Y with unwinding rolls 7*y* and loop stores 20*y* in transverse direction by means of a ventilated 90°-deflection bar 33 into the longitudinal direction X. With this, it is also possible to position a separate unwinding station with unwinding rolls 7*y* and loop stores 20*y* and braking—and guiding walls 10*y* in transverse direction next to the machine, which unwinding station is not bounded by the chain run of the machine. The example of FIG. 9 furthermore illustrates a splicing device 35, which is located between the unwinding rolls 7 and the vacuum loop store 10 (FIG. 1). With a splicing station of this kind, a new foil web is capable of being attached to a foil web running out, resp., connected to it, e.g., by gluing, welding or connection with self-adhesive tape.

Within the framework of this description, the following terms are utilised:

1 Flat bed embossing machine, foil stamping machine
2 Foil web installation, foil web guiding installation
3 Embossing table, embossing location
4 Flat bed press
5 Flat material
6 Foil webs
6*a* Image layer side of 6
7 Unwinding rolls
9 Foil feeding device, foil advance device

10 Braking - and guiding wall
10*a* Front edge of 10
11 Supporting layer, supporting—and guiding surface
12 Cloth-like, permeable to air contacting layer
13 Vacuum source, suction fan
14 Suction openings
15 Coverings below 6
16 Coverings between 6
17 Flat vacuum chambers, boxes
18 Direction tangential to 12
19 Throttling point
20 Vacuum loop stores, foil stores
21 Vacuum source, suction fan
22 Slide-in cartridge
23 Partition walls
24 End walls
25 Frame stanchions
26 Separated chambers, boxes
27 Deflection elements
29 Foil removal device
30 Ventilated deflection bars, air cushion axes
31 Micro-porous layer
32 Lateral guiding elements (clips)
33 90°-deflection bar
34 Deflection range
35 Splicing device
L Length of 10
L1,L2,L3, Open partial lengths
Z Braking forces, tensile stresses
dp Vacuum in 10
v Direction of advance of 6
X Longitudinal direction, machine running direction
Y Transverse direction The invention claim is:

1. A foil web installation (2) for a flat bed embossing machine (1), comprising the combination of an embossing table (3) on a flat bed press (4)

and foil webs (6), having an image layer side (6*a*) and a back side, which from unwinding rolls (7) are guided over the embossing table (3) with a foil tensioning device ahead of the embossing table and with foil feeding devices (9) for several foil webs after the embossing table for rapid intermittent advancing the foil webs to a next embossing position in an embossing-free phase of an embossing cycle, wherein between the unwinding rolls (7) and the embossing table (3) at least one flat braking—and guiding wall (10) is provided as foil tensioning device, directly ahead of the embossing table for providing a positioning and an adjustable tensile stress in the foil webs on the embossing table during the whole intermittent embossing cycle and wherein over the whole length of the foil web installation up to the embossing table (3) the foil webs are only contacted on their back side by guiding elements and by the braking—and guiding wall (10), so that the image layer side (6*a*) of the foil webs nowhere is contacted and wherein the braking—and guiding wall (10) comprises a supporting layer (11) with suction openings (14) and a cloth-like contacting layer (12) permeable to air, lying on the supporting layer (11) and attached to it, and an assigned, adjustable vacuum source (13).

2. A foil web installation according to claim 1 wherein additional unwinding rolls (7.3) are provided directly in front of the braking—and guiding wall (10.1) ahead of the embossing table.

3. A foil web installation according to claim 1 wherein more than one braking—and guiding wall is provided, wherein an additional braking—and guiding wall (10.2.) is arranged shortly after a foil store (20).

4. A foil web installation according to claim 1 wherein the length L of the braking—and guiding wall (10) amounts to at least 20 cm.

5. A foil web installation according to claim 1 including a metallic supporting layer (11) with suction openings (14), which comprise an average diameter of 2-5 mm and a surface area proportion of the suction openings of 30-60%.

6. A foil web installation according to claim 1 wherein the supporting layer (11) is designed as a slotted wall with slits in advance direction (v) of the foil webs and with a slit width of 1-3 mm.

7. A foil web installation according to claim 1 wherein the contacting layer (12) is designed to be not electro-statically chargeable and to be permeable for air in tangential direction (18).

8. A foil web installation according to claim 1 wherein the contacting layer (12) comprises a layer thickness of 0.3-3mm and is fixed on the supporting layer (11) in a manner making it interchangeable.

9. A foil web installation according to claim 1 wherein on the braking—and guiding wall (10) coverings impermeable for air (15.1, 15.2) are provided over a part of the length L underneath the foil webs (6.1, 6.2) for the individual adjustment of the braking forces (Z3.1, Z3.2) or that coverings impermeable for air (16) are provided between the foil webs (6.1, 6.2, 6.3).

10. A foil web installation according to claim 1 wherein the braking—and guiding wall (10) is designed to be capable of being slipped-in or interchangeable.

11. A foil web installation according to claim 1 including a vacuum loop store (20) ahead of the embossing table (3).

12. A foil web installation according to claim 11 including a horizontal vacuum double loop store (20) and a braking—and guiding wall (10.2) located above it with a common suction fan (21).

13. A foil web installation according to claim 1 including a vacuum loop store (20) with a removable slide-in cartridge (22) with adjustable partition walls (23) and lower end walls (24), which form chambers not under vacuum suction (26) between the foil webs (6.1, 6.2).

14. A foil web installation according to claim 1 including a foil removal device (29) after the foil feeding devices (9) for the lateral taking away of the embossed foil webs (6.1, 6.2).

15. A foil web installation according to claim 1 including adjustable and matched to one another braking forces and tensile stresses (Z1, Z2, Z3) in the foil webs (6) at the vacuum loop store (Z1) and at the braking—and guiding walls (Z2, Z3).

16. A foil web installation according to claim 1 wherein the positioned foil webs (6) on the embossing table (3) prior to the embossing operation are partially relieved by reverse movement of the foil feeding devices (9), thereupon are embossed and subsequently pulled away once again with the full tensile stress (Z).

17. A foil web installation according to claim 1 wherein ventilated deflection bars (30) with or without lateral guiding elements (32) are provided.

18. A foil web installation according to claim 1 wherein in addition a foil advance (6*y*) in transverse direction (Y) with a braking—and guiding wall (10*y*) in transverse direction is provided.

19. A foil web installation according to claim 1 wherein a foil advance (6*y*) in transverse direction (Y) with a vacuum loop store (20*y*) in transverse direction is provided.

20. A foil web installation according to claim 1 including a foil advance (6*y*) in transverse direction (Y), which is deflected to the longitudinal direction (X) by a ventilated 90.degree.-deflection bar (33).

21. A foil web installation according to claim 1 including a foil advance (6) with a vacuum loop store (20) in longitudinal direction (X), which by means of a ventilated 90.degree.-deflection bar (33) is deflected to the transverse direction (Y).

22. A foil web installation according to claim 1 wherein between the unwinding rolls (7) and a vacuum loop store (20) a splicing device (35) is provided.

23. A flat bed embossing machine with a foil web installation (2) and with at least one braking—and guiding wall (10) according to claim 1.

* * * * *